(12) United States Patent
Topalian et al.

(10) Patent No.: US 12,450,970 B2
(45) Date of Patent: Oct. 21, 2025

(54) LOTTERY TICKET VENDING MACHINE

(71) Applicant: Brightstar Global Solutions Corporation, Providence, RI (US)

(72) Inventors: Medina Marie Topalian, East Greenwich, RI (US); Robert Corvese, Warwick, RI (US); Paul A. Bucci, Glocester, RI (US)

(73) Assignee: BRIGHTSTAR GLOBAL SOLUTIONS CORPORATION, Providence, RI (US)

( * ) Notice: Subject to any disclaimer, the term of this patent is extended or adjusted under 35 U.S.C. 154(b) by 39 days.

(21) Appl. No.: 18/512,583

(22) Filed: Nov. 17, 2023

(65) Prior Publication Data

US 2025/0166445 A1 May 22, 2025

(51) Int. Cl.
*G07F 7/00* (2006.01)
*G06K 19/06* (2006.01)
*G07F 17/32* (2006.01)

(52) U.S. Cl.
CPC ....... *G07F 7/005* (2013.01); *G06K 19/06028* (2013.01); *G07F 17/329* (2013.01)

(58) Field of Classification Search
CPC ........ G07F 17/329; G07F 17/42; G07F 9/006; G07C 15/005
See application file for complete search history.

(56) References Cited

U.S. PATENT DOCUMENTS

| | | | |
|---|---|---|---|
| 3,855,457 A | 12/1974 | Amundson et al. | |
| 5,222,624 A | 6/1993 | Burr | |
| 5,408,417 A | 4/1995 | Wilder | |
| 5,836,498 A | 11/1998 | Turek | |
| 6,609,644 B1 | 8/2003 | Menna | |
| 6,712,253 B2 | 3/2004 | Hargrave et al. | |
| 6,714,838 B2 | 3/2004 | Scrymgeour et al. | |
| 6,726,077 B2 | 4/2004 | Roberts et al. | |
| 7,032,774 B2 | 4/2006 | Boehm et al. | |
| 7,383,099 B2 | 6/2008 | Pollard et al. | |
| 7,562,798 B2 | 7/2009 | Bartolone et al. | |
| 7,665,394 B2 | 2/2010 | Roberts et al. | |
| 7,850,257 B2 | 12/2010 | Roberts et al. | |
| 8,127,973 B2 | 3/2012 | Mirkovic et al. | |
| 8,192,268 B1 | 6/2012 | Karpe | |

(Continued)

FOREIGN PATENT DOCUMENTS

CN    217443917 U    9/2022

OTHER PUBLICATIONS

Extended European Search Report, from corresponding European Patent Application No. 24210802.5, Mar. 3, 2025.

*Primary Examiner* — Thien M Le
*Assistant Examiner* — April A Taylor
(74) *Attorney, Agent, or Firm* — Neal, Gerber & Eisenberg LLP

(57) ABSTRACT

A lottery ticket vending machine configured to obtain code image data (such as bar code image data) from a leading lottery ticket in each of the lottery drawers in the lottery ticket vending machine, and use the code image data for activating or verifying activation of the lottery tickets loaded in the ticket drawers. This expedites the ticket loading process by eliminating the need for an operator to manually and/or separately scan a code (such as a bar code) for each ticket pack loaded into the ticket drawers.

19 Claims, 10 Drawing Sheets

(56) References Cited

U.S. PATENT DOCUMENTS

| | | |
|---|---|---|
| 8,210,921 B1 | 7/2012 | Karpe |
| 8,534,524 B2 | 9/2013 | Businger et al. |
| 8,550,294 B2 | 10/2013 | Martin |
| 9,613,337 B1 | 4/2017 | Garrison |
| 9,685,026 B1 | 6/2017 | Garrison |
| 10,431,048 B2 * | 10/2019 | Ghia .................. G07F 17/3248 |
| 10,438,452 B2 | 10/2019 | Ferron et al. |
| 11,010,987 B2 | 5/2021 | Bucci |
| 2003/0120381 A1 | 6/2003 | Perin et al. |
| 2004/0000572 A1 | 1/2004 | Engelhardt, Jr. et al. |
| 2005/0178810 A1 | 8/2005 | Woods et al. |
| 2007/0017978 A1 | 1/2007 | Ho |
| 2007/0088459 A1 | 4/2007 | Pollard et al. |
| 2010/0308071 A1 | 12/2010 | Businger |
| 2014/0008407 A1 | 1/2014 | Bucci et al. |
| 2016/0232741 A1 | 8/2016 | Assis et al. |
| 2018/0186557 A1 | 7/2018 | Ghia et al. |
| 2019/0355205 A1 * | 11/2019 | Ghia .................... G06Q 20/202 |
| 2020/0211318 A1 * | 7/2020 | Angelopoulos ..... G07F 17/3216 |
| 2020/0323737 A1 | 10/2020 | Einav et al. |
| 2022/0108562 A1 | 4/2022 | Claude et al. |
| 2022/0114842 A1 | 4/2022 | Mejenborg et al. |
| 2022/0114860 A1 | 4/2022 | Mejenborg et al. |
| 2023/0386303 A1 * | 11/2023 | Bettcher .............. G06Q 20/209 |
| 2024/0021054 A1 | 1/2024 | Topalian et al. |

\* cited by examiner

LOTTERY TICKET VENDING MACHINE

BACKGROUND

The present disclosure relates to lottery ticket vending machines.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including: a housing; ticket drawers in the housing, each of the ticket drawers configured to hold a pack of lottery tickets; and a ticket burster in the housing, the ticket burster defining a ticket inlet and a ticket outlet, the ticket burster movable to a plurality of different ticket receipt positions each respectively associated with and in alignment with a different one of the ticket drawers, and the ticket burster including a sensor. The lottery ticket vending machine also includes a processor and a memory device storing a plurality of instructions, which when executed by the processor, cause the processor to, in a ticket loading mode, cause the ticket burster to, for each of the ticket drawers: move the ticket burster into the ticket receipt position associated with that ticket drawer, cause a leading lottery ticket of a lottery ticket pack in the ticket drawer to move into the ticket burster such that a bar code of the leading lottery ticket passes through a scan area associated with the sensor, cause the sensor to scan the barcode of that lottery ticket, receive the barcode image data from the sensor, cause retraction of the lottery ticket from the ticket burster back into the ticket drawer, and use the barcode image data to activate or verify activation of the pack of lottery tickets in the ticket drawer.

In various other embodiments, the present disclosure relates to a lottery ticket vending machine including: a housing; ticket drawer columns in the housing, each of the ticket drawer columns including ticket drawers each configured to hold a pack of lottery tickets; ticket bursters in the housing, each ticket burster associated with a different one of the ticket drawer columns, each ticket burster defining a ticket inlet and a ticket outlet, each ticket burster movable to a plurality of different ticket receipt positions respectively associated with and in alignment with a different one of the ticket drawers of the ticket column that the ticket burster is associated with, and each ticket burster including a sensor. The lottery ticket vending machine also includes a processor and a memory device storing a plurality of instructions, which when executed by the processor, cause the processor to, in a ticket loading mode, for each of the ticket drawer columns, cause the ticket burster associated with that ticket drawer column to, for each of the ticket drawers of the ticket drawer column, perform: a ticket bar code determination step including: moving the ticket burster into the ticket receipt position associated with that ticket drawer, causing the ticket drawer to feed a leading part of a leading lottery ticket of a lottery ticket pack in the ticket drawer into the ticket burster, causing the ticket burster to cause that lottery ticket to move in the ticket burster such that a bar code of the leading lottery ticket passes through a scan area associated with the sensor of the ticket burster, causing the sensor of the ticket burster to scan the barcode of that lottery ticket, receive the barcode image data from the sensor of the ticket burster, and causing the lottery ticket to be retracted from the ticket burster back into the ticket drawer; and a ticket activation step including using the barcode image data to activated or verify activation of the lottery ticket pack in the ticket drawer.

In various other embodiments, the present disclosure relates to a lottery ticket vending machine including: a housing; lottery ticket drawers supported by the housing; a ticket burster supported by the housing, the ticket burster including a sensor; a processor; and a memory device storing a plurality of instructions, which when executed by the processor, cause the processor to automatically operate with the sensor to determine a barcode image data for each of a plurality of lottery ticket packs in the lottery ticket drawers and use the barcode image data to automatically activate or verify activation of the lottery ticket packs without an operator having to cause each of the plurality of lottery ticket packs to be individually scanned before loading the lottery ticket packs into the lottery ticket drawers.

Additional features are described in, and will be apparent from, the following Detailed Description and the figures.

DETAILED DESCRIPTION

In various embodiments, the present disclosure relates to a lottery ticket vending machine that is configured to expedite the ticket pack loading process for lottery tickets loaded in ticket drawers of the lottery ticket vending machine. In various embodiments, each of the ticket bursters of the lottery ticket vending machine includes a suitable ticket sensor configured to obtain code image data (such as bar code image data) from a leading lottery ticket in each of the ticket drawers associated with that ticket burster. In various embodiments, the lottery ticket vending machine includes one or more controllers configured to receive the code image data from the ticket sensors, use the code image data to facilitate activation of the lottery ticket packs loaded in the ticket drawers (and thus the lottery tickets of each of the packs loaded in the ticket drawers). This expedites the ticket loading process by eliminating the need for an operator to manually and/or separately scan a code (such as a bar code) for each ticket pack loaded into one of the ticket drawers of the vending machine (for activation of the ticket pack and/or lottery tickets in the ticket pack) before the operator loads that pack into that ticket drawer.

For a better understanding of the present disclosure, example lottery tickets such as instant lottery tickets are first generally described herein.

Figure 1A:
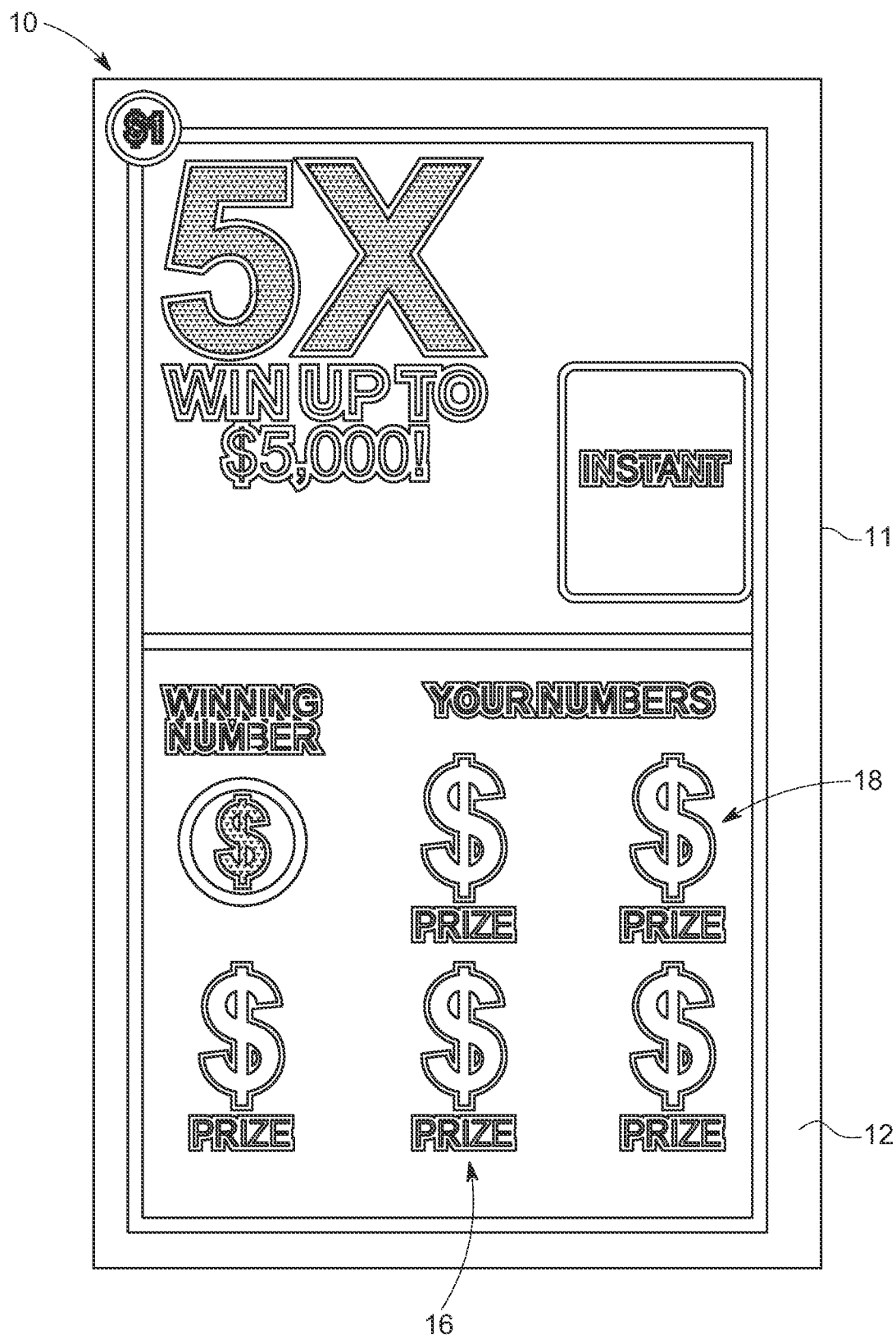
FIG. 1A is a front view of an example instant lottery ticket.
Figure 1B:
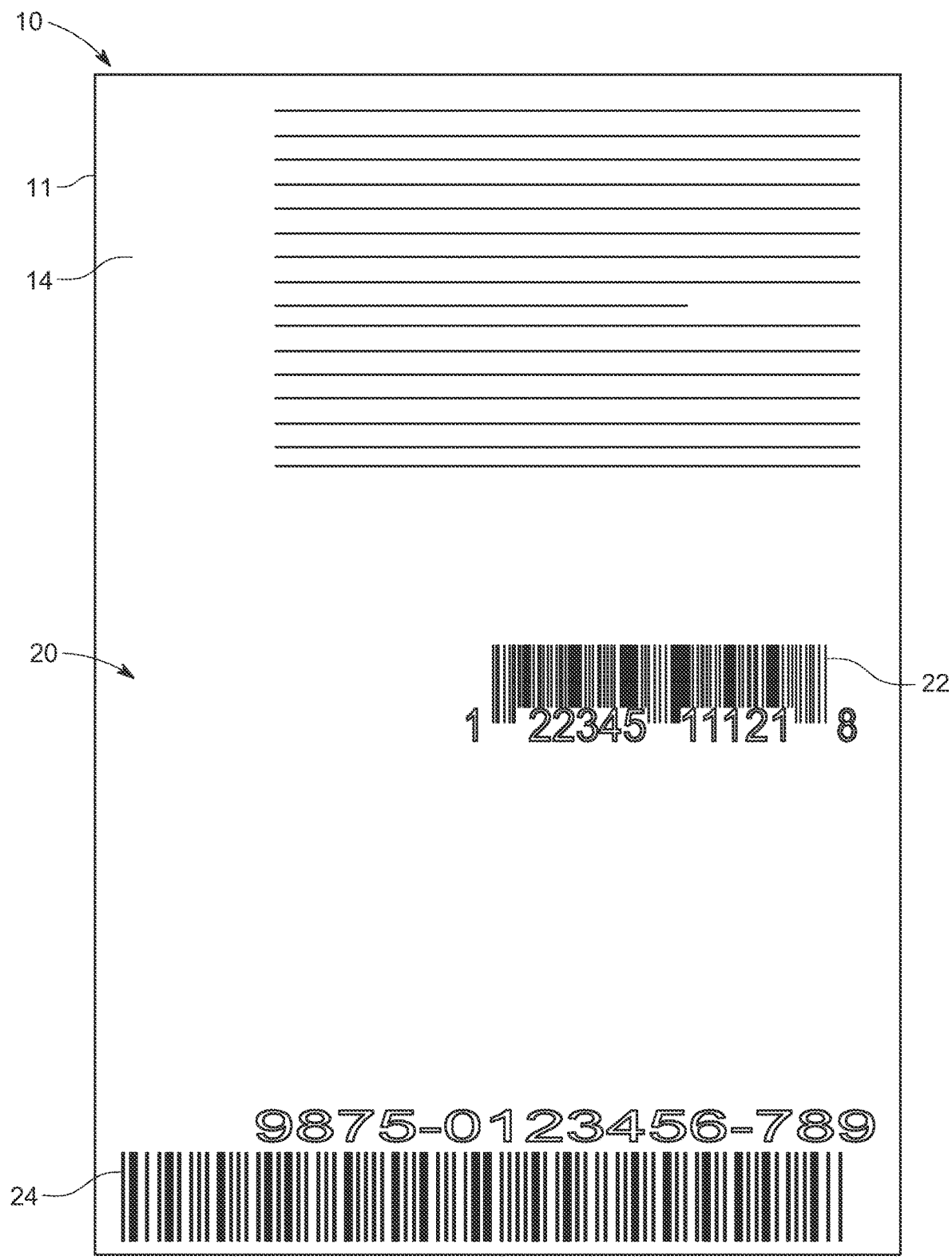
FIG. 1B is a rear view of the example lottery ticket of FIG. 1A showing an example bar code on the back of the lottery ticket.

Various known instant lottery tickets are single game instant lottery tickets. As generally shown in FIGS. 1A and 1B, an example single game instant lottery ticket 10 can include: (1) a ticket substrate 11 having a front surface 12 and a back surface 14; (2) a predefined scratch-off area 16 the front surface 12; (3) variable lottery game indicia (not shown) printed on the predefined scratch-off area 16; (4) a scratch-off coating 18 ("SOC") covering the variable lottery game indicia on the predefined scratch-off area 16; and (5) variable instant lottery ticket information indicia 20 printed on the back surface 14. The instant lottery ticket information indicia 20 can include text, one or more ticket numbers, one or more ticket codes such as example barcodes 22 and 24, and other instant lottery ticket information that is in human readable and machine readable forms. Certain of this instant lottery ticket information: (a) identifies the instant lottery ticket; (b) the pack (and the set and/or run) of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Various instant lottery tickets can have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

As indicated above, various instant lottery tickets are arranged after manufacture (which includes after complete printing) in lottery ticket packs for storage, organization, sorting, picking, shipping to lottery ticket distributors, and to lottery ticket sellers such as retailers, and for subsequent activation (such as on a pack by pack level). Instant lottery ticket packs can include a plurality of lottery tickets that are all of the same type, same size, and for the same game(s), and can be protected for storage and shipping by a transparent pack wrapping, such as transparent plastic wrapping, securely wrapped around the plurality of lottery tickets. A pack of lottery tickets can include all of the lottery tickets attached to each other but joined by perforations. Such lottery tickets of a pack can be detached from each other along such perforations. While tickets of each pack are often manufactured in a continuous strip that is fan-folded for convenient supply, the packs can be in other forms such as in a roll form. These packs in the fan-folded form or in the roll form are configured to dispensing via a lottery ticket vending machine. After shipping to a lottery ticket seller, the lottery ticket seller can unwrap the lottery ticket pack and scan in one of the bar codes of one of the lottery tickets in the lottery ticket pack using a lottery terminal. The lottery terminal sends the bar code information to a central lottery system. The central lottery system checks that the ticket pack is authentic, at the correct lottery ticket seller, and activates the lottery tickets in the ticket pack such that any winning lottery tickets of that pack can later be redeemed for any awards associated with those winning lottery tickets.

An example lottery ticket vending machine that is configured to expedite the ticket pack loading process for lottery tickets loaded in ticket drawers of the lottery ticket vending machine is now first described before describing the ticket loading mode in which the lottery ticket vending machine of the present disclosure operates. It should be appreciated that the lottery ticket vending machine that performs the ticket loading mode of the present disclosure can be alternatively configured in accordance with the present disclosure.

FIGS. 2, 3, 4, 5, 6, 7, 8, and 9 illustrate a lottery ticket vending machine 100 of one example embodiment of the present disclosure. The lottery ticket vending machine 100 may be referred to herein as the "ticket vending machine" or the "vending machine" for brevity.

The illustrated example ticket vending machine 100 includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 includes a ticket collection receptacle 250 configured to receive separated lottery tickets from each of the ticket bursters 400*a*, 400*b*, and 400*c*. The quantity, positions, sizes, and configurations of the ticket drawer columns, the ticket drawers, and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form or a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400*a*, 400*b*, and 400*c* as further discussed herein to facilitate the dispensing of each requested lottery ticket. The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices, one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
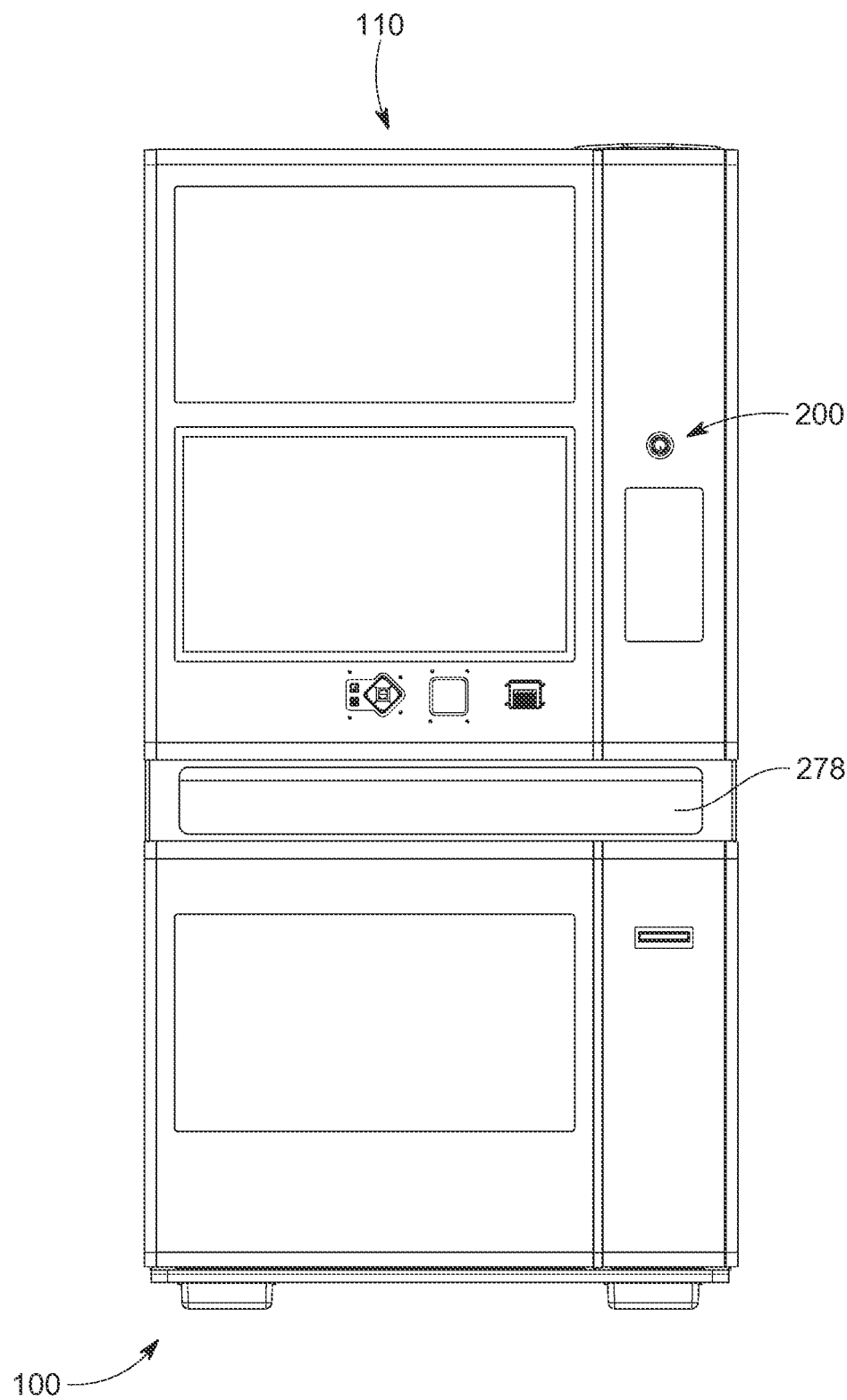
FIG. 2 is a front perspective view of a lottery ticket vending machine of one example embodiment of the present disclosure shown with a front door thereof in a closed position.
Figure 3:
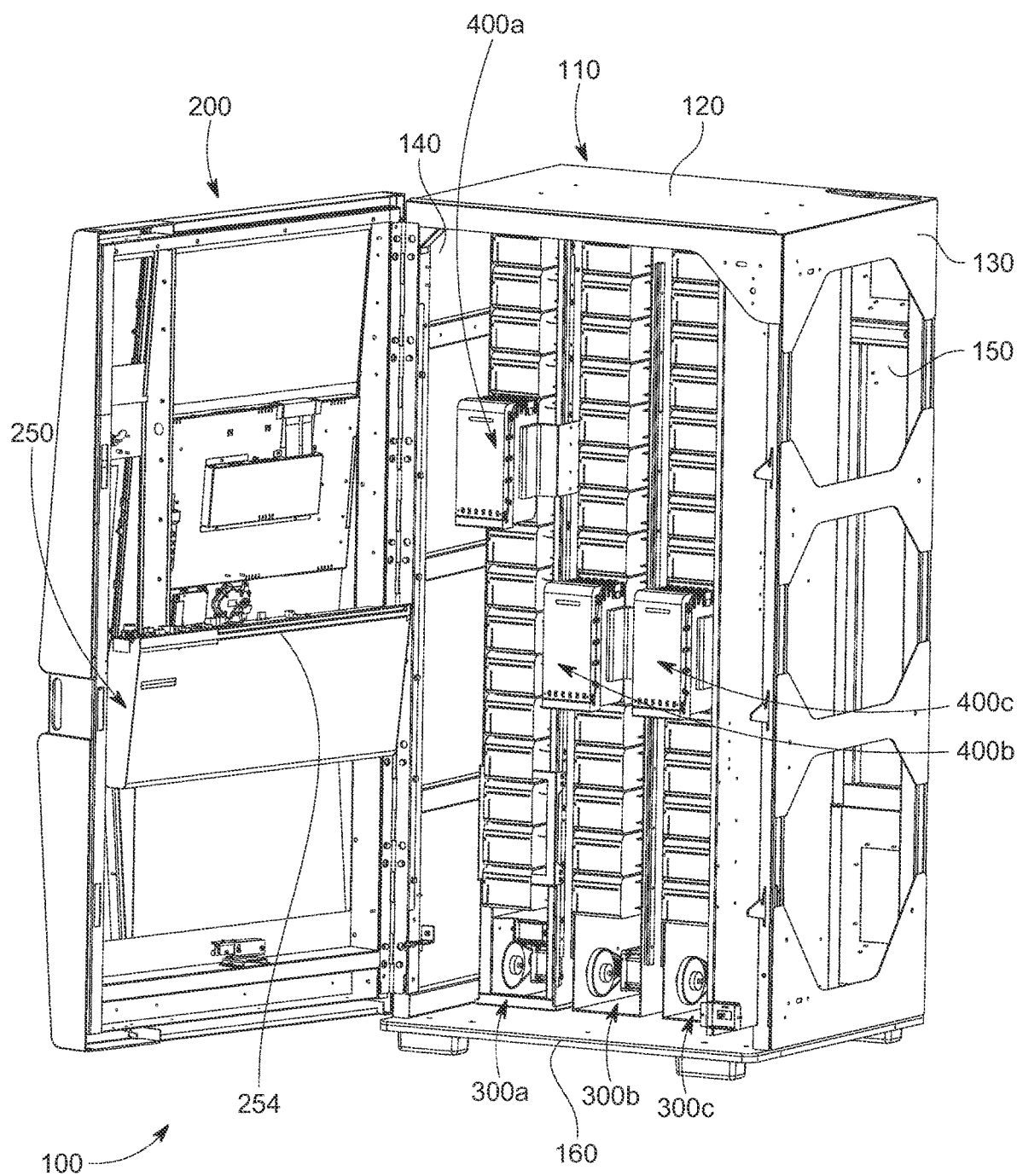
FIG. 3 is a front perspective view of the lottery ticket vending machine of FIG. 2 shown with the front door thereof in an open position, shown with a left side wall panel thereof removed, showing three ticket drawer columns and three movable ticket bursters respectively associated the three ticket drawer columns, and showing a ticket collection receptacle of the front door.
Figure 4:
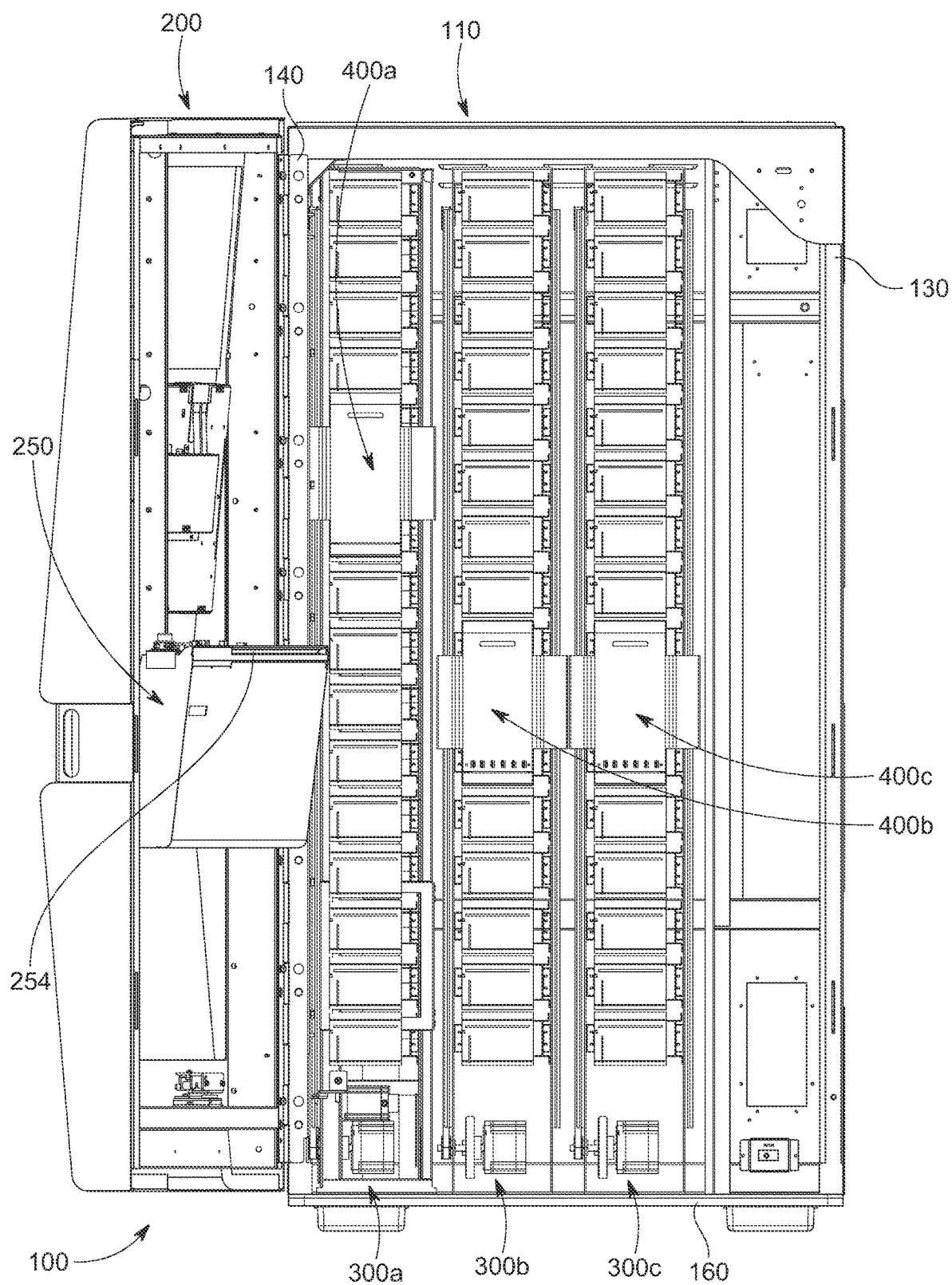
FIG. 4 is a front view of the lottery ticket vending machine of FIG. 2 shown with the front door thereof in the open position, shown with the left side wall panel thereof removed, showing the three ticket drawer columns and the three movable ticket bursters respectively associated the three ticket drawer columns, and showing the ticket collection receptacle of the front door.
Figure 5:
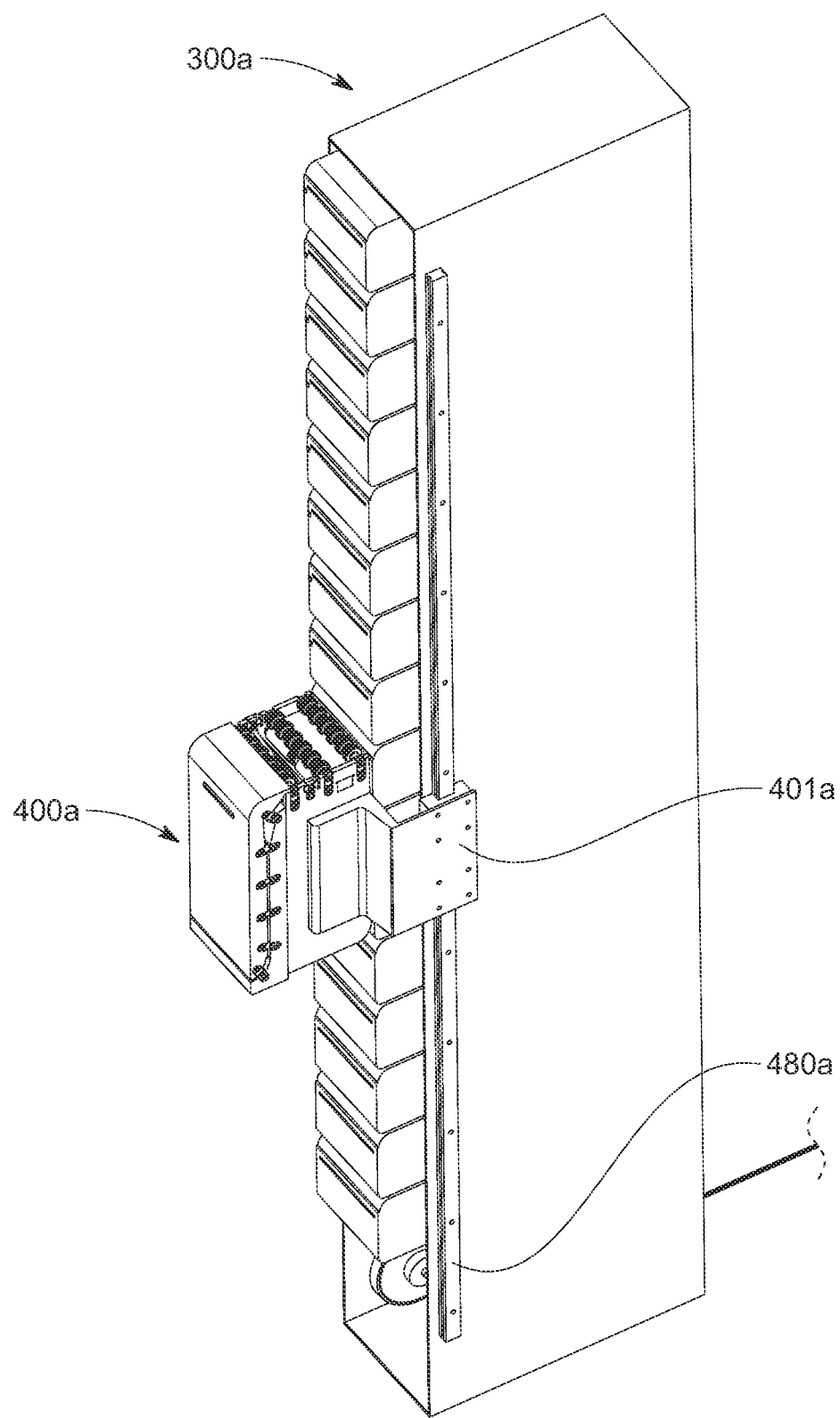
FIG. 5 is an enlarged fragmentary perspective view of one of the ticket drawer columns and the ticket burster associated with that ticket drawer column of the lottery ticket vending machine of FIG. 2.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer columns 300a, 300b, and 300c. The front door 200 is moveable from a closed and locked position covering the open front face of the machine housing 110 as shown in FIG. 2 to an open position allowing access to the interior of the machine housing 110 as shown in FIGS. 3 and 4. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The size and configuration of the machine housing can vary in accordance with the present disclosure.

The ticket collection receptacle 250 of the front door 200 is configured to receive lottery tickets from each of the movable ticket bursters 400a, 400b, and 400c. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 3 and 4). The ticket collection receptacle 250 and the front door define an elongated horizontally extending purchase ticket retrieval slot 278 (best seen in FIG. 2). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer columns 300a, 300b, or 300c. The position, size, and configuration of the ticket collection receptacle can vary in accordance with the present disclosure.

Each of the ticket drawer columns 300a, 300b, and 300c are identical in this example embodiment. For brevity, only ticket drawer column 300a is described in detail herein.

Likewise, the three movable ticket bursters 400a, 400b, and 400c are identical in this example embodiment. For brevity, only ticket burster 400a associated with the ticket drawer column 300a is described in detail herein.

Ticket drawer column 300a includes a series of aligned ticket drawers (not individually labeled) that are vertically stacked in the column. Each of the ticket drawers is configured to hold one or more packs of lottery tickets such as instant lottery tickets for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. Each ticket drawer is configured to hold lottery tickets (such as instant lottery tickets of one or more lottery ticket packs) for selection by the purchasers. In various embodiments, the different ticket drawers can hold different lottery ticket packs for different lottery games, but it should be appreciated, that two or more ticket drawers can hold the same type of lottery tickets.

The lottery tickets in each of the ticket drawers of the ticket drawer column 300a are movable into the associated ticket burster 400a after the ticket burster 400a is moved into alignment with such ticket drawer for receipt, bursting, and dispensing of that lottery ticket (such as shown in FIGS. 6, 7, 8, and 9). The lottery tickets in each of the ticket drawers of the ticket drawer column 300a are also retractable back from the associated ticket burster 400a after the ticket burster 400a (prior to being separated by the buster 400a from the next lottery ticket of the strip of lottery tickets of the pack in the ticket drawer).

Each of the ticket drawers of each of the ticket drawer columns can include or be associated with a suitable ticket movement assembly (not shown). In various embodiments, the ticket movement assembly of the ticket drawer is configured to move the leading lottery ticket in the ticket drawer at least partially into the respective burster when that burster is aligned with that ticket drawer so that the ticket engagers of the burster can grip and then subsequently move that lottery ticket in that burster. In various embodiments, the burster includes an actuator (not shown) configured to engage an actuation lever (not shown) of the ticket movement assembly (not shown) to cause the movement of the leading lottery ticket by the ticket drawer movement assembly. The ticket drawer movement assembly can include ticket engagers (such as rollers mounted on shafts (not shown)), gearing (not shown), and an actuation lever (not shown). The actuation lever is engagable by an actuator (not shown) of the burster (after the burster is aligned with the ticket drawer) to cause the ticket movement assembly to move a leading ticket in the ticket drawer into the burster and to retract the leading ticket back into the ticket drawer.

It should be appreciated that the movement of the lottery tickets into and out of the bursters can be done in multiple other different ways.

Thus, the vending machine 100 is configured to cause a leading lottery ticket from each of the lottery ticket drawers to move into a burster and then retract from the burster. This enables the vending machine 100 to read and use a code on the ticket from each pack during the ticket loading process as further described below.

As best shown in FIGS. 3, 4, 5, and 6, the movable ticket burster 400a is supported by one or more burster supporters (such as burster supporter 480a). The burster supporters can be any suitable structure(s) that support(s) the ticket burster 400a in a manner that enables the ticket burster 400a to vertically move to any of the different ticket receipt positions that are associated with and in alignment with the respective ticket drawers of the ticket drawer column 300a. Each of the burster supporters also support the ticket burster 400a in a manner that enables the ticket burster 400a to vertically move to into alignment with the ticket receptacle 250.

The ticket vending machine 100 includes one or more actuators (not shown) that control movement of the ticket burster 400a under control of the controller of the ticket vending machine 100 and/or the controller of the ticket burster 400a. In this example, an actuator (not labeled) is mounted at the bottom of the ticket drawer column 300a and coupled to the ticket burster 400a by suitable linkages (such as but not limited to pulleys and a drive belt (not labeled)). The actuator is configured to move the ticket burster 400a under the control of the controller(s) in the vertical (e.g., up and down) directions. The movable ticket burster 400a is thus moveable, via this actuator and linkages on the ticket burster supporters to different vertical locations including a plurality of the locations respectively associated and aligned with each of the ticket drawers of the ticket drawer column 300a such that the ticket burster 400a is positioned to receive one or more of the lottery tickets stored in each respective ticket drawer of the ticket drawer column 300a for loading purposes during the ticket loading process, and for obtaining and dispensing instant lottery tickets into the ticket receptacle 400 for the purchaser as requested by the purchaser.

Figure 6:
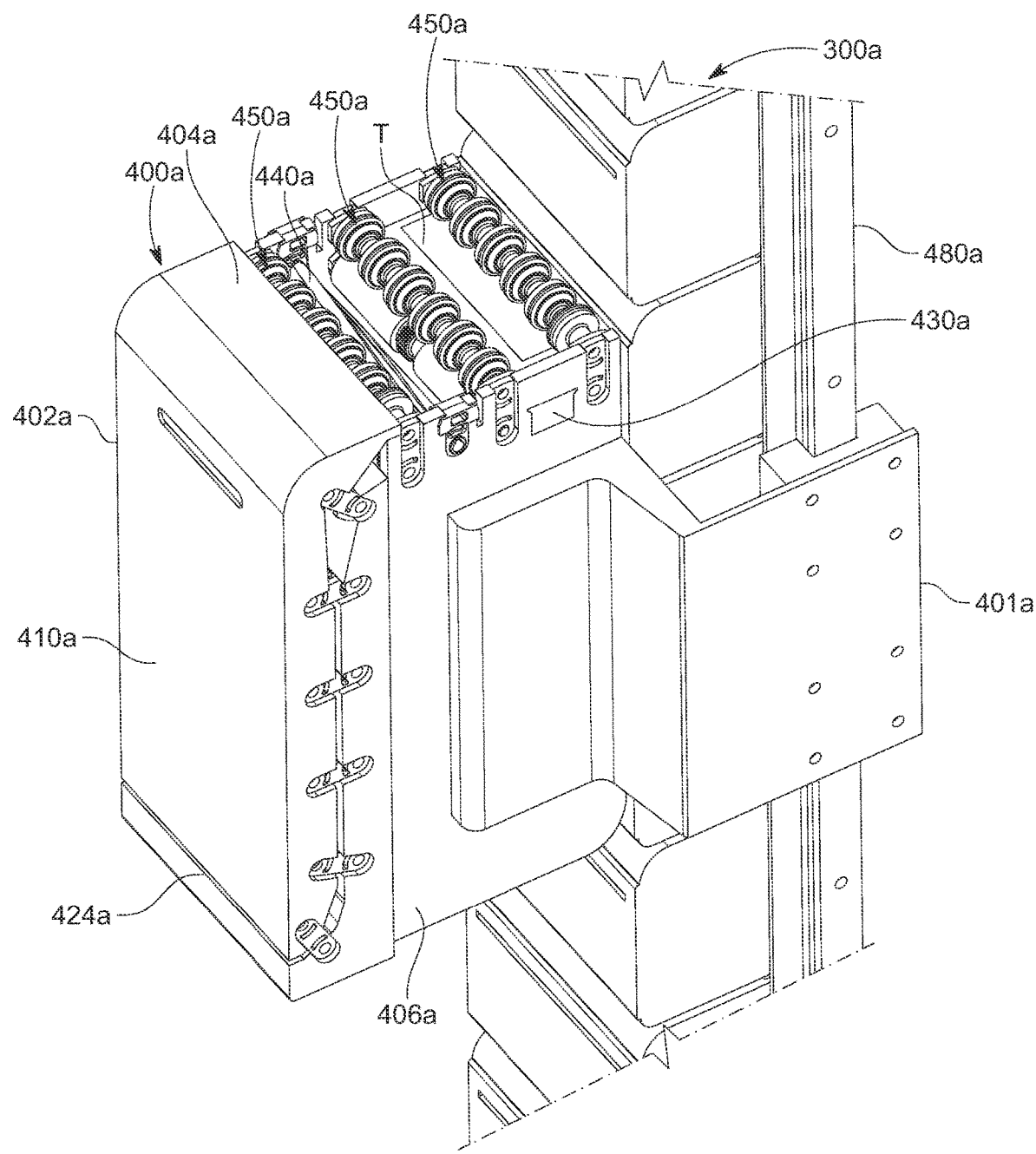
FIG. 6 is enlarged fragmentary perspective view of the ticket drawer columns and the ticket burster of FIG. 5.
Figure 7:
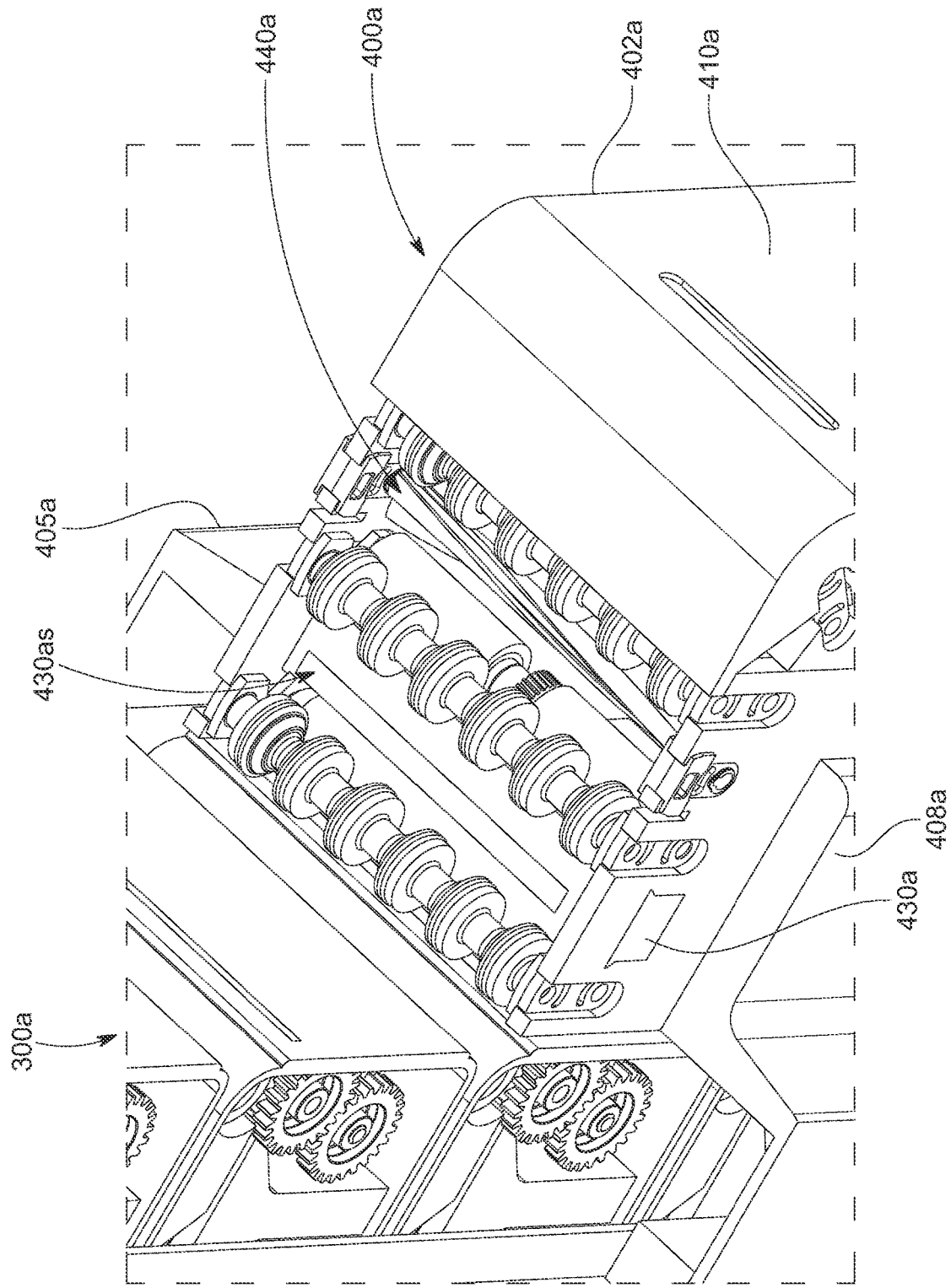
FIG. 7 is an enlarged fragmentary perspective view of the ticket drawer column and the ticket burster of FIG. 5.

As best shown in FIGS. 6 and 7, the example movable ticket burster 400a includes: (a) a burster housing 402a; (b) one or more burster supporter connecters (such as burster support connector 404a connecting the burster housing 402a and the burster supporter 480a); (c) a ticket sensor 430a in and supported by the burster housing 402a; (d) a ticket cutter 440a in and supported by the burster housing 402a; (e) a plurality of ticket engagers 450a supported by the burster housing 402a; and (f) a burster controller (not shown). The size and configuration of the ticket burster can vary in accordance with the present disclosure.

The burster housing 402a includes a top member 404a, spaced-apart side members 406a and 408a, a front member 410a, a rear member 412a, and a bottom member 414a. The burster housing 402a also includes a plurality of internal members (not individually labeled) that define a ticket inlet 422a, through which the ticket burster 400a is configured to receive a lottery ticket (such as lottery ticket T as shown in FIG. 6) from a ticket drawer of the ticket drawer column 300a, a ticket outlet 424a through which the ticket burster 400a is configured to dispense the received instant lottery ticket into the ticket collection receptacle 250, and a ticket movement path (not labeled) extending from the ticket inlet 422a to the ticket outlet 424a and through which the lottery ticket is moved through the ticket burster 400a.

The ticket cutter 440a is positioned in the burster housing 402a and configured to rotate to cut the perforations attaching each instant lottery ticket that moves along the ticket movement path in the ticket burster 400a to the next instant lottery ticket of the continuous strip of lottery tickets received from the respective ticket drawer. The ticket cutter 440a is configured to make such cut along the perforations between the two connected instant lottery tickets of such strip. The ticket cutter 440a is controlled by the burster controller and/or the controller of the ticket vending machine 100. In this example embodiment, the ticket cutter 440a is inwardly positioned (i.e., positioned downstream) from the ticket inlet 422a. After the ticket cutter 440a cuts the instant lottery ticket requested by the purchaser from the respective ticket drawer, the ticket drawer can retract the portion of the next instant lottery ticket (of the strip of lottery tickets) from the ticket burster 400a before the ticket burster 400a moves from the ticket receipt position aligned with that ticket drawer. In other embodiments, the ticket burster 400a can be configured such that the ticket cutter is positioned closer to or on the other side of the ticket inlet (i.e., positioned upstream of the ticket inlet) such that after the ticket cutter cuts the lottery ticket along the perforations connecting that lottery ticket to the next lottery ticket in the strip, the ticket drawer may not need to withdraw the next instant lottery ticket in the strip or may only need to withdraw the next instant lottery ticket in the strip a relatively small distance. The position, size, and configuration of the ticket cutter can thus vary in accordance with the present disclosure.

In other embodiments, the ticket burster 400a can be configured such that the burster housing 402a is rotatable about a horizontal axis to separate (via a tearing and/or twisting motion) each instant lottery ticket along the perforations connecting that instant lottery ticket to the next lottery ticket in the strip. In such embodiments, the ticket drawer may not need to withdraw the next instant lottery ticket of the strip or may only need to withdraw the next instant lottery ticket of the strip a relatively small distance. In such embodiments, the ticket burster may not need a ticket cutter.

The ticket burster 400a is thus configured to burst the perforations between the leading lottery ticket being dispensed and the next lottery ticket of the strip so as to enable the dispensed lottery ticket to be dispensed into the ticket receptacle 250. This also prevents a person from being able to pull an extended number of lottery tickets from one of the ticket packs in one of the ticket drawers. It should be appreciated that the ticket burster 400a can be moved to a dispensing location for each instant lottery ticket dispensed. It should also be appreciated that the ticket burster can moved to a different location for any lottery ticket that is deemed to be bad or non-dispensable for any reason, and to deposit that ticket into a suitable rejection area.

The ticket vending machine of the present disclosure can have more than one ticket burster associated with each ticket drawer column such that they can operate at the same time, or such that one or more ticket bursters are back-ups in case there is an issue with one of the other ticket bursters for that ticket drawer column.

The ticket engagers 450a include multiple driven rollers (not labeled) and multiple guide rollers (not labeled). The driven rollers are rotated by suitable actuators such as motors (not shown) under the control of the burster controller and/or the controller of the ticket vending machine 100. The driven rollers and the guide rollers are configured to move (such as by pulling) and guide each lottery ticket along the ticket movement path and out of the ticket outlet 424a. In alternative embodiments, the ticket engagers are configured to grip and pull each lottery ticket from the respective ticket drawer.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400a. The burster controller can be hard wired or wirelessly connected to and in communication with the cutter 440a, the actuators for the driven rollers 450a, any actuators of the ticket burster 400a that cause the movement of the ticket burster 400a, and the ticket sensor 430a (as further described below). In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators (such as the motors) for the driven rollers, any actuators (such as the motors) on the ticket burster or the burster supporter that cause the movement of the ticket burster, and the ticket sensor.

The ticket sensor 430a of the ticket burster 400a is positioned in and supported by the housing 402a of the ticket burster 400a. The ticket sensor 430a extends transversely along the entire width or substantially the entire width of the ticket burster 400a such that it can obtain an image of part or all of the entire width of each lottery ticket or codes (such as bar codes) thereon that moves through the ticket burster 400a as that lottery ticket moves above the ticket sensor 430a. In this example embodiment, the ticket sensor 430a includes a scanning window 430 as that is below the ticket movement path in the ticket burster 400a and to enable the ticket sensor 430a to scan upwardly toward the lottery ticket. In this example embodiment, the ticket sensor 430a is below the ticket movement path and thus scans upwardly toward the lottery ticket. The ticket sensor 430a is configured to read the bar code of the lottery ticket as that lottery ticket moves from a ticket drawer into the ticket burster 400a. In other words, the ticket senor 430a is configured to scan part of the lottery ticket as that lottery ticket moves in the ticket movement path and through a scan area above the ticket senor 430a. The ticket senor 430a is configured to communicate related code image data (regarding the lottery ticket and specifically for the barcode of the lottery ticket) to the burster controller and/or the controller of the ticket vending machine 100. The burster controller and/or the controller of the ticket vending machine 100 are configured to use this ticket related code data and determine the code information such as the bar code information of the lottery ticket. After the burster controller and/or the controller of the ticket vending machine 100 determines that the code information of the lottery ticket, the burster controller and/or the controller of the ticket vending machine 100 can take one or more of a series of different actions depending on the mode of operation of the vending machine 100.

One mode of operation for the vending machine 100 is a ticket loading mode. In the ticket loading mode, the vending machine 100 performs a series of ticket bar code scanning and data transmission steps to determine the lottery tickets in each of the drawers of the vending machine 100, to activate or verify that the lottery tickets in the ticket drawers of the vending machine 100 are activated, to verify the lottery tickets loaded in the ticket drawers to the operator, and to ready itself for the dispensing of the lottery tickets from the drawers when the vending machine 100 is in a ticket dispensing mode of operation.

In various embodiments, the vending machine 100 is configured to enable the ticket loading mode to be initiated by one or more operator inputs. For example, the vending machine 100 is configured to enable the ticket loading mode to initiated by an input made by an operator via an input device (such as an interface or button) of the vending machine 100. The input by the operator can be any suitable input and indicates to the controller of the vending machine 100 that the operator is loading or going to load packs of lottery tickets into one or more of the respective drawers of the vending machine 100. After loading the lottery ticket pack(s), the operator can initiate another input that informs the controller of the vending machine 100 that the operator is done loading the lottery ticket packs into the drawers of the vending machine 100, and that the controller of the vending machine 100 should cause the lottery ticket determination and activation or verification steps. In various such embodiments, the operator does not need to close the front door for the controller to perform these the lottery ticket determination and the activation or verification steps (described below). In various other embodiments, the operator needs to close the front door of the vending machine 100 (such as for safety purposes) for the controller to cause these the lottery ticket determination and activation or verification steps.

In various other embodiments, the vending machine 100 is configured to enable the ticket loading mode to be initiated by one or more physical actions. For example, the ticket loading mode can be initiated by an operator opening the front door of the vending machine 100. When the operator opens the front door, a door sensor (not shown) of the vending machine 100 sends a signal to the controller of the vending machine 100 indicating that the front door has been opened and that the operator may load lottery ticket packs into one or more drawers of the vending machine 100. Thereafter, when the front door is closed by the operator, the door sensor (not shown) sends a signal to the controller of the vending machine 100 indicating that the front door is closed and thus that the operator is done loading any ticket packs into the drawers of the vending machine 100. At that point, the controller can cause the determination and activation or verification steps of the ticket loading mode.

In various other embodiments, the vending machine 100 is configured to enable the ticket loading mode to be initiated by the operator closing the front door of the vending machine 100. At that point, the controller can cause the determination and activation or verification steps of the ticket loading mode. In this example, the controller assumes that every time the door is closed, that one or more drawers may be loaded with additional lottery ticket packs, and thus operates in the ticket loading mode.

In these two physical indication example embodiments, the controller assumes that every time the door is opened and then closed, that one or more drawers may be loaded with additional lottery ticket packs, and thus operates in the ticket loading mode after the door is closed.

In various other embodiments, the vending machine 100 is configured to initiate the ticket loading mode in either of:

(1) the first above example and the second above example; or (2) the first above example and the third above example.

In various embodiments, after the initiation step, the controller of the vending machine 100 automatically provides the determination and activation or verification steps for the leading lottery ticket in each drawer of the vending machine 100. It should be appreciated that in various embodiments, the controller causes the leading lottery ticket from each drawer to be determined and activation or verified even though the controller may have data indicating that no lottery tickets have been dispensed from one or more of the drawers since the last ticket loading process and the last activation or verification of lottery tickets in such drawers. The controller does this in part because: (1) the lottery tickets in a drawer may have been replaced by the operator (such as because no one is buying such lottery tickets); (2) a drawer may have been replaced in its entirety; or (3) one or more of the drawers may positioned in a different position than the drawer was previously positioned (for example, two drawers can be switched by the operator).

Figure 8:
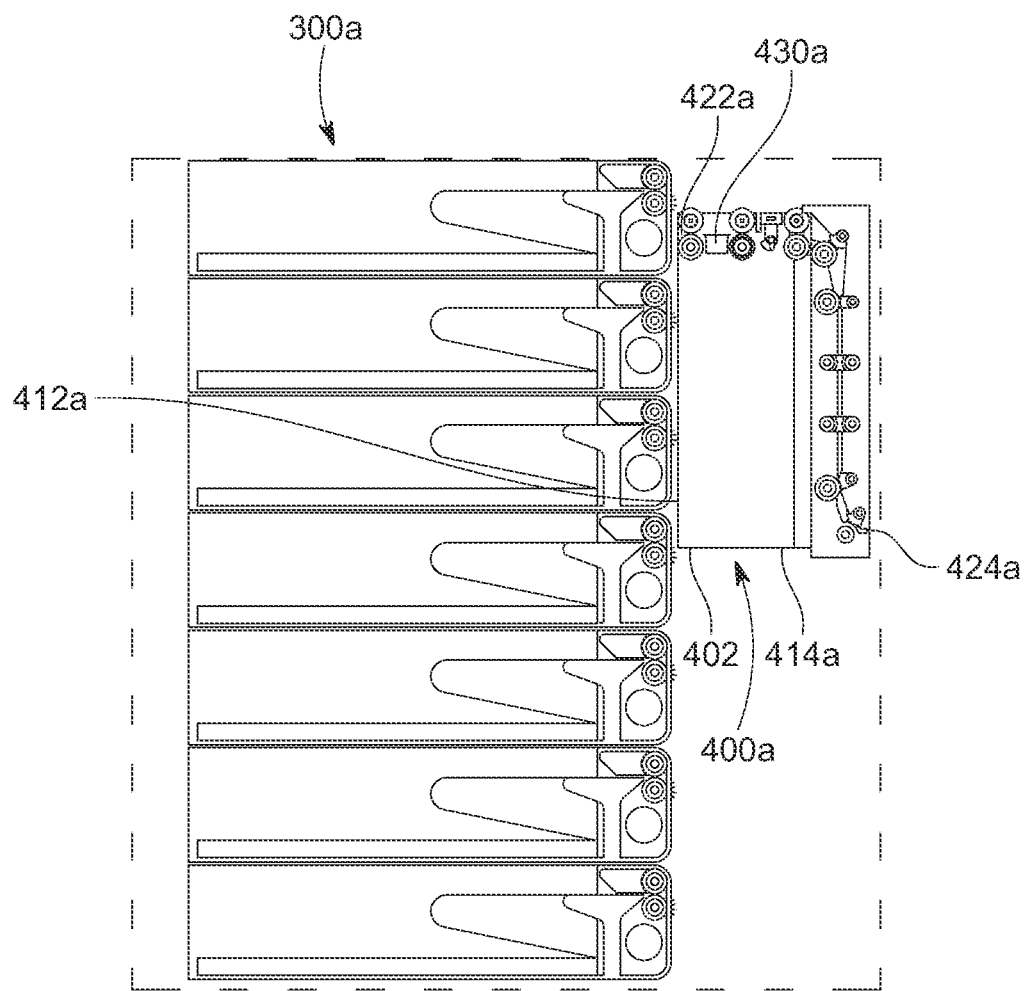
FIG. 8 is an enlarged fragmentary side view of the ticket drawer column and the ticket burster of FIG. 5.
Figure 9:
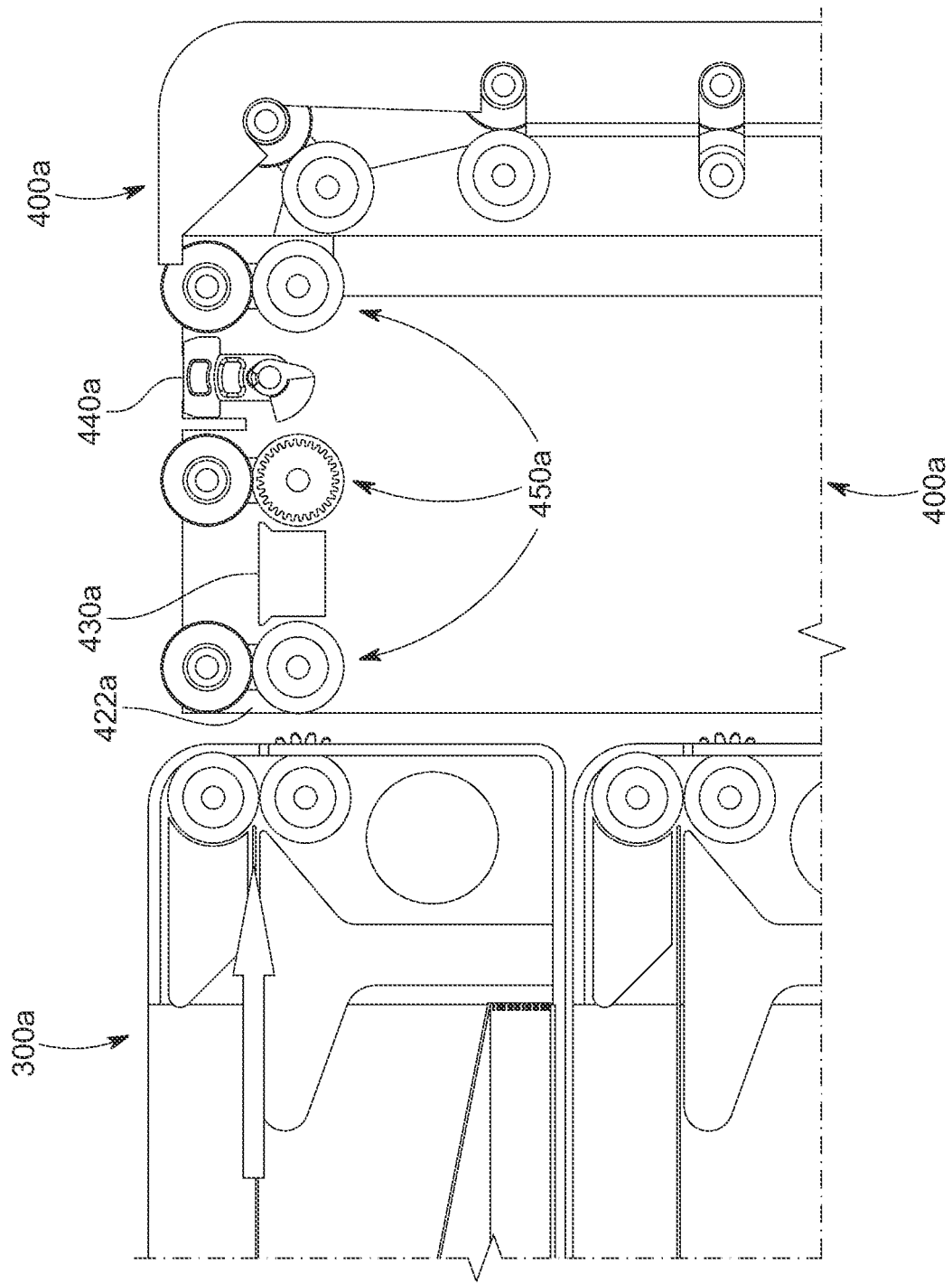
FIG. 9 is a further enlarged fragmentary side view of the ticket drawer column and the ticket burster of FIG. 5.

In various embodiments, the determination step performed by the ticket vending machine 100 as part of the ticket loading mode for each ticket drawer includes the vending machine 100: (1) moving the respective ticket burster into a ticket receipt position associated with and in alignment with that ticket drawer (such as shown in FIGS. 8 and 9); (2) causing a leading part of the leading lottery ticket (such as the topmost lottery ticket) of the lottery ticket pack in that ticket drawer to be fed into the ticket inlet of the ticket burster with the front face of the lottery ticket facing upwardly; (3) causing the ticket engagers of that ticket burster to engage and cause that lottery ticket to move along the ticket movement path of the ticket burster such that the bar code on the bottom of the lottery ticket passes through a scan area over the ticket sensor 430*a* of that ticket burster 400*a*; (4) when the lottery ticket passes through the scan area above the ticket sensor 430*a* of that ticket burster 400*a*, causing the ticket sensor 430*a* to scan the barcode of that lottery ticket, and send barcode image data to the burster controller and/or the controller of the ticket vending machine; and (5) cause the ticket engagers of the burster and/or the ticket drawer to retract that lottery ticket from the ticket burster back into the ticket drawer for subsequent dispensing. In various embodiments, these determination steps can be performed for more than one ticket in a drawer.

In various embodiments, the activation or verification step performed by the ticket vending machine 100 as part of the ticket loading mode for each drawer includes the vending machine 100 using the barcode image data obtained based on the bar code of the leading lottery ticket in the drawer for lottery ticket loading of the lottery ticket packs in that drawers.

In various embodiments, the activation or verification step performed by the ticket vending machine 100 as part of the ticket loading mode for each drawer includes the vending machine 100 using the barcode image data obtained based on the bar code of the leading lottery ticket in the drawer to cause activation or verification of the activation of the lottery tickets of the pack in that drawer (including the leading lottery ticket). In various such embodiments, the controller of the vending machine communicates with a central lottery system to facilitate the activation or verification of the lottery ticket packs. More specifically, the controller of the vending machine 100, for each drawer, sends the barcode image data for the lottery ticket and thus the lottery ticket pack in that drawer to a central lottery system to enable the central lottery system to activate or verify activation of that pack of lottery tickets for the vending machine 100.

The first time that the barcode image data for a lottery ticket (and thus for the lottery ticket pack) is sent to the central lottery system, the central lottery system can determine if that lottery ticket pack is an authorized pack at the correct selling location. This can be done in a conventional manner (such as how such activation is done by known lottery terminals and central lottery systems). If the pack is not an authorized pack or not at the correct selling location, the central lottery system sends a message back to the vending machine 100 and/or the operator thereof to enable the operator to investigate the issue and to prevent the vending machine 100 from dispensing the lottery tickets from that pack. If the pack is an authorized pack and at the correct selling location, the central lottery system sends a message back to the vending machine 100 to enable the vending machine 100 to dispense the lottery tickets from that pack.

Since a pack of lottery tickets may not be replaced every time one or more of the packs of the vending machine 100 are replaced, a ticket from a pack in a drawer where the pack has already been activated is likely to occur in the embodiments where the vending machine 100 scans the leading ticket from every drawer during the determination steps. In such case, for the activation or verification steps, the vending machine 100 can operate in one of two different manners. The first manner is that the vending machine 100 operates in the same manner as described above and sends the barcode image data for the lottery ticket and thus the lottery ticket pack to the central lottery system regardless of whether the ticket pack has already been activated. The central lottery system can essentially re-activate the pack or verify activation of the pack and the central lottery system can send a message back to the vending machine to enable the vending machine to continue to dispense the lottery tickets from that pack. The second manner is that the vending machine, since the central lottery system has already activated the pack or verified that the pack has been activated, does not send the barcode image data to the central lottery system, but rather simply continues to dispense tickets from that pack.

In various other embodiments, the controller of the vending machine can have suitable activation data for the lottery ticket packs and thus conduct the activation or verification of the lottery ticket packs internally without requesting activation or verification of activation from a central lottery system. In certain such embodiments, the controller of the vending machine can receive that activation data from the central lottery system or from an operator thereof. In certain such embodiments, the controller sends data to the central lottery system informing the central lottery system of the activation of the packs by the vending machine 100.

In various embodiments, at the end of the ticket loading mode, the lottery vending machine displays an indication that the lottery ticket packs are activated and the that the vending machine 100 is ready to dispense the lottery tickets in the drawers.

In various embodiments, at the end of the ticket loading mode, the lottery vending machine displays (via one of its display devices) suitable information regarding each pack of lottery tickets in each of the drawers for an operator to see and verify.

After these processes have been performed (for each drawer and the lottery ticket packs in the drawers have been activated or verified as activated), the vending machine can exit the ticket loading mode.

In the above example embodiments, the method includes checking the leading lottery ticket in each drawer during each ticket loading process. For this vending machine 100, there are 3 bursters 400a, 400b, and 400c, and three drawer columns 300a, 300b, and 300c that each have 16 drawers. These 3 bursters 400a, 400b, and 400c can check the leading tickets in the drawers simultaneously, substantially simultaneously, or in a rapid sequence such that the determination and activation or verification steps of this ticket loading mode is relatively short.

In various embodiments, the method can also include verifying that the lottery ticket packs loaded in each drawer is the correct lottery ticket pack.

In various embodiments, the method can also include determining one or more of the lottery ticket pack parameters for each lottery ticket pack such that those parameters can be used for configuration of the lottery ticket vending machine. These parameters can include, for each lottery ticket pack, the quantity of lottery tickets in that lottery ticket pack. The parameters can include, for each lottery ticket pack, the overall length of a lottery ticket in that lottery ticket pack which can then be used by the lottery ticket vending machine for scanning and cutting each lottery ticket at a correct locations based on the barcodes and the perforations for such lottery tickets in the lottery ticket pack.

In various embodiments, instead of the activation or verification of the activation of an entire pack of lottery tickets based on the scanning of a leading lottery ticket of the pack of lottery tickets in each drawer (such as described above), the activation or verification of the activation of lottery tickets can be on a ticket by ticket basis based on the scanning of each lottery ticket of each of the pack of lottery tickets in each drawer. In other words, when ay lottery ticket moves into the respective burster, the vending machine can cause scanning and activation of that lottery ticket.

In various embodiments, the vending machine can display, via one of the display devices of the vending machine and via one or more interfaces, suitable indications of each of the packs in each of the drawers after the lottery ticket loading process and an activation of each of the packs for the operator. These indications can include the lottery game name, the drawer, the quantity of tickets expected to be in the pack in the drawer, and/or any other suitable information.

In various embodiments, the vending machine can display, via one of the display devices of the vending machine and via one or more interfaces, suitable indication of which drawer to load which lottery ticket packs in such drawers.

In various embodiments, the vending machine can request pack and or activation information from the central lottery system to facilitate the ticket loading processes described herein.

These example methods provide various advantages over the operation of various known lottery ticket vending machines. These advantages include but are not limited to: (1) eliminating the need for an operator to enter information regarding each pack of lottery tickets that the operator places in the respective draws; (2) eliminating the need for an operator to physically scan the barcode of a lottery ticket of each pack of lottery tickets in each draw before the operator places each respective pack in the respective drawer; (3) automatically checking the leading ticket of the pack in each drawer after the packs have been loaded in the drawers (such as after the front door is closed); (4) reduces or eliminates the possibility of the lottery ticket packs being loaded into the wrong ticket drawer; and (5) increases the likelihood of dispensing the correct lottery ticket that a player selected.

In a ticket dispensing mode, the vending machine 10 performs a series of ticket dispensing steps. An example method of operation of the ticket vending machine 100 in a ticket dispensing mode is now described. This example is after the vending machine 100 has performed the steps of a ticket loading mode such as described above.

This example uses the first ticket burster 400a and a drawer from the ticket drawer column 300a for dispensing a ticket from that ticket drawer. After receiving an input for a request to purchase a lottery ticket in one of the drawers of the drawer column 300a and a payment for that lottery ticket, the controller determines the drawer that holds that lottery ticket and then causes that lottery ticket to be obtained from then drawer and deposited into the ticket receptacle 250. This includes: (1) moving the ticket burster 400a into a ticket receipt position associated with and in alignment with the ticket drawer of the ticket drawer column 300a that holds that lottery ticket (such as shown in FIGS. 8 and 9); (2) causing a leading portion of the leading lottery ticket in the ticket drawer to be fed into the ticket inlet 422a of the ticket burster 400a (with the front face of the lottery ticket facing upwardly); (3) causing the ticket engagers 450a to engage and cause that lottery ticket to move along the ticket movement path of the ticket burster 400a; (4) at the appropriate time when the lottery ticket passes through the scan area above the ticket sensor 430a, scan the barcode of the lottery ticket, and send barcode image data to the burster controller and/or the controller of the ticket vending machine 100; (5) causing the ticket cutter of the ticket burster to cut the lottery ticket from the next lottery ticket from that drawer; (6) causing the ticket drawer to retract that next lottery ticket from the ticket burster 400a; (7) causing the ticket burster 400a with the lottery ticket to move to a position adjacent to the ticket receptacle 250; and (8) causing the ticket burster 400a to dispense the lottery ticket into the ticket receptacle 250. The method can include the controller of the ticket vending machine 100 sending suitable data related to the lottery ticket dispensed to a central lottery system.

It should also be appreciated that the vending machine can be configured to perform a ticket checking mode, where the controllers perform the ticket checking function for one or more of the ticket drawers. This ticket checking mode can be on an automatic basis (such as once per day), on an operator scheduled basis, or subject to an operator input. The ticket checking mode can operate in the same manner as in a ticket loading mode described above, but may not include sending data to the central lottery system.

It should be appreciated that these example methods are not the only methods of operation of the ticket vending machine of the present disclosure, and other methods of operation are within the scope of the present disclosure. It should also be appreciated that the operations are controlled by the controller of the ticket vending machine and/or the controller of the ticket bursters, and that the descriptions provided herein of the steps are controlled by such controllers.

In various embodiments, the ticket sensor includes a camera configured to take one or more images of the lottery ticket, create code image data, and send the ticket code image data to the controller(s) for analysis.

In various embodiments, the ticket sensor includes a plurality of adjacent optical sensors configured obtain ticket data and send the code image data to the controller(s) for analysis.

In various embodiments, the ticket sensor includes a compact image sensor ("CIS") reader that is configured to read bar codes on the lottery tickets and send ticket edge image data to the controller(s) for analysis.

It should also be appreciated from the above that the movable ticket burster of the present disclosure can replace the multiple stationary dispensing devices that are respectively mounted in front of each of the respective ticket drawers in various known instant lottery ticket vending machines. It should also be appreciated that by eliminating the multiple stationary dispensing devices, a greater quantity of ticket drawers can be employed than in various known instant lottery ticket vending machines.

It should further be appreciated from the above that various embodiments of the present disclosure provide a lottery ticket vending machine comprising: (1) a housing; (2) ticket drawers in the housing, each of the ticket drawers configured to hold a pack of lottery tickets; (3) a ticket burster in the housing, the ticket burster defining a ticket inlet and a ticket outlet, the ticket burster movable to a plurality of different ticket receipt positions each respectively associated with and in alignment with a different one of the ticket drawers, the ticket burster comprising a sensor; (4) a processor; and (5) a memory device storing a plurality of instructions, which when executed by the processor, cause the processor to, in a ticket loading mode, cause the ticket burster to, for each of the ticket drawers: (a) move the ticket burster into the ticket receipt position associated with that ticket drawer, (b) cause a leading lottery ticket of a lottery ticket pack in the ticket drawer to move into the ticket burster such that a bar code of the leading lottery ticket passes through a scan area associated with the sensor, (c) cause the sensor to scan the barcode of that lottery ticket, (d) receive the barcode image data from the sensor, (e) cause retraction of the lottery ticket from the ticket burster back into the ticket drawer, and (f) use the barcode image data to activate or verify activation of the pack of lottery tickets in the ticket drawer. In various such embodiments, when executed by the processor, the instructions cause the processor to, for each of the ticket drawers, use the barcode image data for the lottery ticket in the ticket drawer to activate the lottery ticket pack in that ticket drawer. In various such embodiments, when executed by the processor, the instructions cause the processor to, for each of the ticket drawers, use the barcode image data for the lottery ticket in the ticket drawer to be sent to a central lottery system to activate the lottery ticket pack in the ticket drawer. In various such embodiments, when executed by the processor, the instructions cause the processor to, for each of the ticket drawers, receive an activation indication of the lottery ticket pack in the ticket drawer from the central lottery system. In various such embodiments, when executed by the processor, the instructions cause the processor to cause a display, by a display device, of the activation indication of the lottery ticket packs in each of the ticket drawers. In various such embodiments, when executed by the processor, the instructions cause the processor to, in the ticket loading mode, cause the movements of the ticket burster into the ticket receipt positions associated with the ticket drawers responsive to receipt of a signal indicating that a door of the housing is closed. In various such embodiments, when executed by the processor, the instructions cause the processor to, in the ticket loading mode, automatically cause the movements of the ticket burster into the ticket receipt positions associated with the ticket drawers responsive to receipt of a signal indicating that a door of the housing is closed. In various such embodiments, when executed by the processor, the instructions cause the processor to, in the ticket loading mode, cause the movements of the ticket burster into the ticket receipt positions associated with the ticket drawers responsive to receipt of a signal from an input device. In various such embodiments, when executed by the processor, the instructions cause the processor to, in the ticket loading mode, to automatically cause the movements of the ticket burster into the ticket receipt positions associated with the ticket drawers responsive to receipt of a signal from an input device.

It should further be appreciated from the above that various embodiments of the present disclosure provide a lottery ticket vending machine comprising: (1) a housing; (2) ticket drawer columns in the housing, each of the ticket drawer columns including ticket drawers each configured to hold a pack of lottery tickets; (3) ticket bursters in the housing, each ticket burster associated with a different one of the ticket drawer columns, each ticket burster defining a ticket inlet and a ticket outlet, each ticket burster movable to a plurality of different ticket receipt positions respectively associated with and in alignment with a different one of the ticket drawers of the ticket column that the ticket burster is associated with, each ticket burster comprising a sensor; (4) a processor; and (5) a memory device storing a plurality of instructions, which when executed by the processor, cause the processor to, in a ticket loading mode, for each of the ticket drawer columns, cause the ticket burster associated with that ticket drawer column to, for each of the ticket drawers of the ticket drawer column, perform: (a) a ticket bar code determination step comprising: moving the ticket burster into the ticket receipt position associated with that ticket drawer, causing the ticket drawer to feed a leading part of a leading lottery ticket of a lottery ticket pack in the ticket drawer into the ticket burster, causing the ticket burster to cause that lottery ticket to move the ticket in the ticket burster such that a bar code of the leading lottery ticket passes through a scan area associated with the sensor of the ticket burster, causing the sensor of the ticket burster to scan the barcode of that lottery ticket, receive the barcode image data from the sensor of the ticket burster, and causing the lottery ticket to be retracted from the ticket burster back into the ticket drawer; and (b) a ticket activation step comprising using the barcode image data to activated or verify activation of the lottery ticket pack in the ticket drawer. In various such embodiments, when executed by the processor, the instructions cause the processor to automatically cause the ticket bar code determination step responsive to a door of the housing being closed. In various such embodiments, when executed by the processor, the instructions cause the processor to cause the ticket bar code determination step responsive to receipt of an input. In various such embodiments, when executed by the processor, the instructions cause the processor to for each of the ticket drawers, use the barcode image data for the leading ticket in the ticket drawer to activate or verify activation of the lottery ticket pack in the ticket drawer. In various such embodiments, when executed by the processor, the instructions cause the processor to, for each of the ticket drawers, use the barcode image data for the leading ticket in the ticket drawer to be sent to a central lottery system to activated or verify activation of the lottery ticket pack in the ticket drawer. In various such embodiments, when executed by the processor, the instructions cause the processor to, for each of the ticket drawers, receive an activation indication of the lottery ticket pack from the central lottery system. In various such embodiments, when executed by the processor, the instructions cause the processor to cause a display, by a display device, of an activation indication of the lottery ticket packs in each of the lottery ticket drawers.

It should further be appreciated from the above that various embodiments of the present disclosure provide a lottery ticket vending machine comprising: (1) a housing; (2) lottery ticket drawers supported by the housing; (3) a ticket burster supported by the housing, the ticket burster comprising a sensor; (4) a processor; and (5) a memory device storing a plurality of instructions, which when executed by the processor, cause the processor to automatically operate with the sensor to determine a barcode image data for each of a plurality of lottery ticket packs in the lottery ticket drawers and use the barcode image data to automatically activate or verify activation of the lottery ticket packs without an operator having to cause each of the plurality of lottery ticket packs to be individually scanned before loading the lottery ticket packs into the lottery ticket drawers. In various such embodiments, when executed by the processor, the instructions cause the processor to, for each of the ticket drawers, use the barcode image data for the leading ticket in the ticket drawer to activate or verify activation of the lottery ticket pack in that ticket drawer. In various such embodiments, when executed by the processor, the instructions cause the processor to, for each of the ticket drawers, use the barcode image data for the leading ticket in the ticket drawer to be sent to a central lottery system to activate or verify activation of the lottery ticket pack in the ticket drawer. In various such embodiments, when executed by the processor, the instructions cause the processor to, for each of the ticket drawers, receive an activation indication of the lottery ticket pack from the central lottery system.

It should further be appreciated from the above, that instead of a lottery ticket pack activation as described in various of the above embodiments, the vending machine can cause activation or verify activation on a lottery ticket level.

It should further be appreciated from the above, that the verification of the activation on a lottery ticket level or a lottery pack level can thus be after the lottery ticket or lottery ticket pack has been activated in another manner such as by the operator or otherwise.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:
a housing;
ticket drawers in the housing, each of the ticket drawers configured to hold a pack of lottery tickets;
a ticket burster in the housing, the ticket burster defining a ticket inlet and a ticket outlet, the ticket burster movable to a plurality of different ticket receipt positions each respectively associated with and in alignment with a different one of the ticket drawers, the ticket burster comprising a sensor;
a processor; and
a memory device storing a plurality of instructions, which when executed by the processor, cause the processor to, in a ticket loading mode, cause the ticket burster to, for each of the ticket drawers:
move the ticket burster into a ticket receipt position associated with a ticket drawer,
cause a leading lottery ticket of a lottery ticket pack in the ticket drawer to move into the ticket burster such that a bar code of the leading lottery ticket passes through a scan area associated with the sensor,
cause the sensor to scan the barcode of the leading lottery ticket,
receive the barcode image data from the sensor,
cause retraction of the leading lottery ticket from the ticket burster back into the ticket drawer, and
use the barcode image data to activate or verify activation of the lottery ticket pack in the ticket drawer.

2. The lottery ticket vending machine of claim 1, wherein when executed by the processor, the instructions cause the processor to, for each of the ticket drawers, use the barcode image data for the leading lottery ticket in the ticket drawer to activate the lottery ticket pack in the ticket drawer.

3. The lottery ticket vending machine of claim 1, wherein when executed by the processor, the instructions cause the processor to, for each of the ticket drawers, use the barcode image data for the leading lottery ticket in the ticket drawer to be sent to a central lottery system to activate the lottery ticket pack in the ticket drawer.

4. The lottery ticket vending machine of claim 3, wherein when executed by the processor, the instructions cause the processor to, for each of the ticket drawers, receive an activation indication of the lottery ticket pack in the ticket drawer from the central lottery system.

5. The lottery ticket vending machine of claim 4, wherein when executed by the processor, the instructions cause the processor to cause a display, by a display device, of the activation indication of the packs of lottery tickets in the ticket drawers.

6. The lottery ticket vending machine of claim 1, wherein when executed by the processor, the instructions cause the processor to, in the ticket loading mode, cause the movements of the ticket burster into the ticket receipt positions associated with the ticket drawers responsive to receipt of a signal indicating that a door of the housing is closed.

7. The lottery ticket vending machine of claim 1, wherein when executed by the processor, the instructions cause the processor to, in the ticket loading mode, automatically cause the movements of the ticket burster into the ticket receipt positions associated with the ticket drawers responsive to receipt of a signal indicating that a door of the housing is closed.

8. The lottery ticket vending machine of claim 1, wherein when executed by the processor, the instructions cause the processor to, in the ticket loading mode, cause the movements of the ticket burster into the ticket receipt positions associated with the ticket drawers responsive to receipt of a signal from an input device.

9. The lottery ticket vending machine of claim 1, wherein when executed by the processor, the instructions cause the processor to, in the ticket loading mode, to automatically cause the movements of the ticket burster into the ticket receipt positions associated with the ticket drawers responsive to receipt of a signal from an input device.

10. A lottery ticket vending machine comprising:
a housing;
ticket drawer columns in the housing, each of the ticket drawer columns including ticket drawers each configured to hold lottery ticket pack;
ticket bursters in the housing, each ticket burster associated with a different one of the ticket drawer columns, each ticket burster defining a ticket inlet and a ticket outlet, each ticket burster movable to a plurality of different ticket receipt positions respectively associated with and in alignment with a different one of the ticket drawers of the ticket drawer column that the ticket burster is associated with, each ticket burster comprising a sensor;

a processor; and a memory device storing a plurality of instructions, which when executed by the processor, cause the processor to, in a ticket loading mode, for each of the ticket drawer columns, cause the ticket burster associated with a ticket drawer column to, for each of the ticket drawers of the ticket drawer column, perform:

a ticket bar code determination step comprising:
    moving the ticket burster into a ticket receipt position associated with a ticket drawer,
    causing the ticket drawer to feed a leading part of a leading lottery ticket of a lottery ticket pack in the ticket drawer into the ticket burster,
    causing the ticket burster to cause the leading lottery ticket to move the ticket in the ticket burster such that a bar code of the leading lottery ticket passes through a scan area associated with the sensor of the ticket burster,
    causing the sensor of the ticket burster to scan the barcode of the leading lottery ticket,
    receive the barcode image data from the sensor of the ticket burster, and
    causing the leading lottery ticket to be retracted from the ticket burster back into the ticket drawer; and a ticket activation step comprising:
    using the barcode image data to activated or verify activation of the lottery ticket pack in the ticket drawer.

11. The lottery ticket vending machine of claim 10, wherein when executed by the processor, the instructions cause the processor to automatically cause the ticket bar code determination step responsive to a door of the housing being closed.

12. The lottery ticket vending machine of claim 10, wherein when executed by the processor, the instructions cause the processor to cause the ticket bar code determination step responsive to receipt of an input.

13. The lottery ticket vending machine of claim 10, wherein when executed by the processor, the instructions cause the processor to, for each of the ticket drawers, use the barcode image data for the leading lottery ticket in the ticket drawer to activate or verify activation of the lottery ticket pack in the ticket drawer.

14. The lottery ticket vending machine of claim 10, wherein when executed by the processor, the instructions cause the processor to, for each of the ticket drawers, use the barcode image data for the leading ticket in the ticket drawer to be sent to a central lottery system to activated or verify activation of the lottery ticket pack in the ticket drawer.

15. The lottery ticket vending machine of claim 14, wherein when executed by the processor, the instructions cause the processor to, for each of the ticket drawers, receive an activation indication of the lottery ticket pack from the central lottery system.

16. The lottery ticket vending machine of claim 14, wherein when executed by the processor, the instructions cause the processor to cause a display, by a display device, of an activation indication of the lottery ticket packs in each of the lottery ticket drawers.

17. A lottery ticket vending machine comprising:

a housing;

lottery ticket drawers supported by the housing;

a ticket burster supported by the housing, the ticket burster comprising a sensor;

a processor; and a memory device storing a plurality of instructions, which when executed by the processor, cause the processor to:
    automatically operate with the sensor to determine a barcode image data for each of a plurality of lottery ticket packs in the lottery ticket drawers and use the barcode image data to automatically activate or verify activation of the lottery ticket packs without an operator having to cause each of the plurality of lottery ticket packs to be individually scanned before loading the lottery ticket packs into the lottery ticket drawers, and
    for each of the ticket drawers, use the barcode image data for a leading ticket in a ticket drawer to activate or verify activation of a lottery ticket pack in the ticket drawer.

18. The lottery ticket vending machine of claim 17, wherein when executed by the processor, the instructions cause the processor to, for each of the ticket drawers, use the barcode image data for the leading ticket in the ticket drawer to be sent to a central lottery system to activate or verify activation of the lottery ticket pack in the ticket drawer.

19. The lottery ticket vending machine of claim 18, wherein when executed by the processor, the instructions cause the processor to, for each of the ticket drawers, receive an activation indication of the lottery ticket pack from the central lottery system.

\* \* \* \* \*